Oct. 31, 1961        H. HÖLLER        3,006,240
SYNCHRONIZING DEVICE FOR A FILM PROJECTOR
AND A SOUND TAPE APPARATUS
Filed Aug. 3, 1959        2 Sheets-Sheet 1
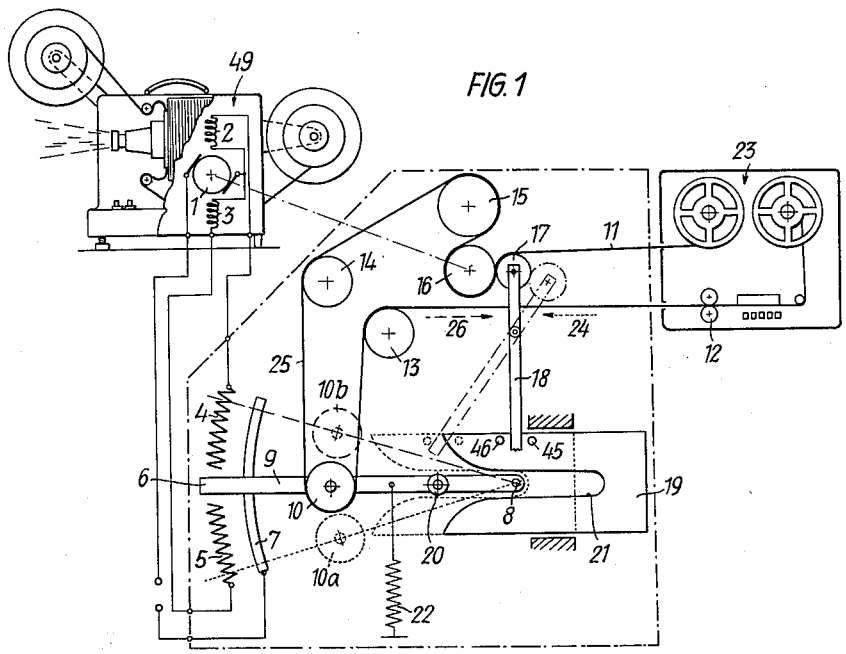
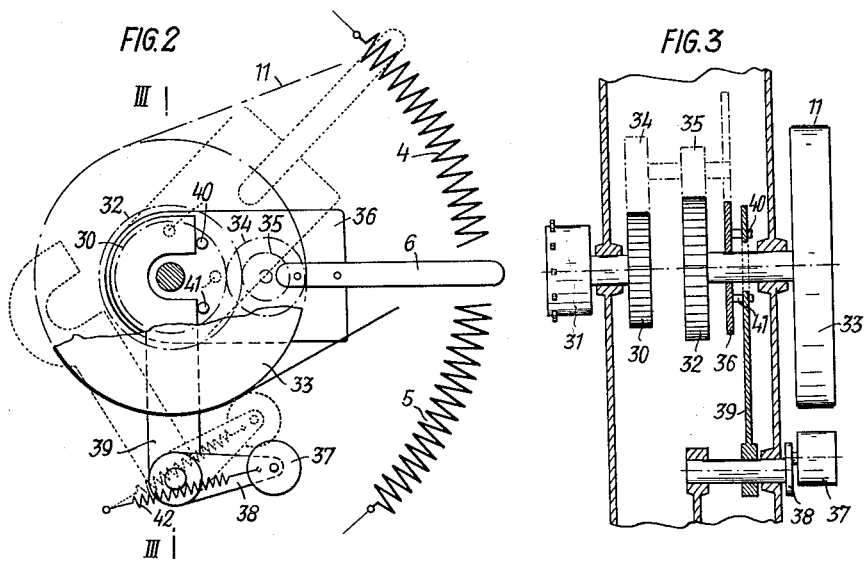
INVENTOR
HERMANN HOLLER
BY *Otto John Munz*
Attorney

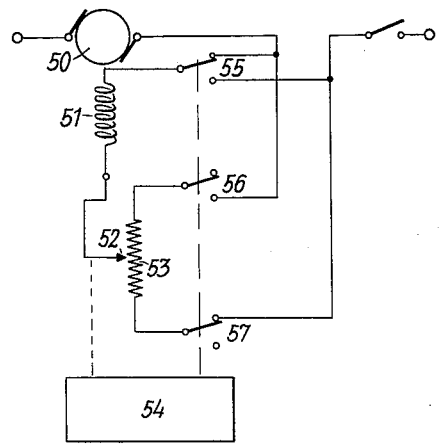
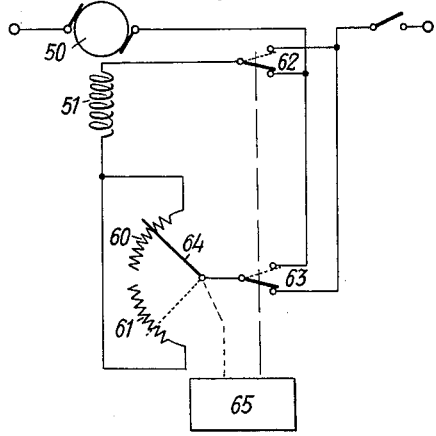

United States Patent Office 3,006,240
Patented Oct. 31, 1961

3,006,240
SYNCHRONIZING DEVICE FOR A FILM PROJECTOR AND A SOUND TAPE APPARATUS
Hermann Höller, Vienna, Austria, assignor to Alois Handler and Karl Vockenhuber, both of Vienna, Austria
Filed Aug. 3, 1959, Ser. No. 831,150
Claims priority, application Austria Aug. 12, 1958
6 Claims. (Cl. 88—16.2)

This invention relates to a synchronizing device for a film projector and a sound tape playback apparatus in which the speed of rotation of the projector motor is controlled by automatic control apparatus synchronizing film advancement with the sound tape as a function of changes in the difference in length between the length of film advanced and the corresponding length of sound tape normally spooled when the projector and playback apparatus are in synchronous operation.

In a known construction of this kind the sound tape, which is driven with constant speed in the sound tape playback apparatus is guided by a friction roller arrangement, which imparts a speed to the sound tape proportional to the instantaneous speed of rotation of the projector motor. The sound tape forms a loop between the friction roller arrangement and the constantly rotating roll of the sound tape apparatus. The length of the loop varies in dependence upon changes of the length of film advanced and the corresponding length of sound tape normally spooled in synchronous operations.

The lengths of film considered in such a device is a length of film which is transformed in the ratio of the nominal speed of film and sound tape to the equivalent length of sound tape, i.e., having, for example, a sound tape nominal speed of 9.5 cm./sec. and an 8 mm.-film, which is projected with a motor speed of 16 frames per second. The length of film converted to the equivalent tape is $$L_{red} = L \cdot \frac{9.5}{16 \cdot 0.381}$$

Whereby L is the effective length of film. In the known arrangements the dimension of the loop of the sound tape is sensed by a roller arranged on a spring-biased pivotable lever. This lever adjusts a variable resistor arranged in the circuit of the projector motor or switches a fixed resistor on and off, respectively, whereby eventual differences in the synchronous running of film and sound tape are compensated.

According to another modification the control loop is formed by the film and the arrangement operates substantially as described above.

Besides an electrical control of the speed of rotation of the projector motor it had been proposed to variably adjust mechanical speed control apparatus in response to the dimension of the control loop. The mechanical speed control equipment is, of course, coupled to the projector motor.

In another known construction the difference between the lengths of film advanced and corresponding sound tape normally spooled is ascertained by differential gearing. Therein one input of the differential gearing is driven by the sound tape, the other input of the gearing is driven by the film. The output of the differential gearing influences the speed of rotation of the projector motor corresponding to the difference between the lengths of film advanced and corresponding sound tape spooled.

The above-mentioned arrangements essentially correspond to one another in their mode of operation. To start with the film and sound tape have to be threaded into the respective apparatus; the film as well as the sound tape have starting marks, which are placed opposite fixed marks provided on both apparatus. When actuating the sound tape apparatus the entire arrangement must be started so that film and sound tape run synchrounously.

With the known synchronizing apparatus it is difficult to repeat individual scenes. The repetition of individual scenes is, for example generally used by amateurs for synchronizing the film. A correct synchronous reproduction of picture and sound is particularly required in voice-recordings or to attain special effects. For this reason it is necessary, in general, to repeat the sound reproduction process a few times until a correct synchronized reproduction is achieved. The synchronizing process is rendered very complicated in the known apparatus since synchronism is lost when rewinding the film and the sound tape. For this reason the film and sound tape have to be completely rewound and again restarted after having adjusted the film and tape start indicia to the starting marks.

For this reason in the known apparatus the supplementary synchronization especially with voice recordings had been extremely troublesome and time consuming. The known apparatus have another disadvantage in that it is impossible to repeat individual scenes properly synchronized with the sound when projecting a film.

It is a principal object of the invention to eliminate these disadvantages. The present invention is new and novel in that means are provided for automatically changing or reversing the direction of rotation of the projector motor in case the motor is leading to a certain extent compared with the drive of the sound tape, and also in the provision of automatic control means variable according to the direction of rotation of the film drive and in that individual automatic control elements are provided for each direction of rotation. Because of two-direction control the synchronous advancement of film and sound tape is also secured when rewinding or in reverse operation so that individual scenes may be repeated any number of times whatsoever without influencing the synchronous correlation of picture frames and sound. The arrangement according to the invention has the additional advantage that the projector is arrested by reverse current braking in an extremely quick manner, after the magnetic sound tape playback apparatus has been switched off. In the known apparatus, however, the projector freely rotates when the playback apparatus is switched off so that there is a loss of synchronization.

To avoid errors in threading of the film and sound tape another object of the invention consists in that resetting means for the automatic control means reversing the direction of rotation of the projector motor is provided. The resetting means brings the automatic sensing and control equipment changing the direction of rotation into a zero position or neutral position and is, for example, automatically operated by lifting a pressure roll or the like operative on the sound tape or the film. The resetting means may also be automatically controlled by other parts or elements. It is important, however, that the other element is actuated upon threading the film or the sound tape and is capable of connecting in the one active position the control equipment to the sound tape and the film, respectively, while in the other position, in which the resetting means is operative, the sound tape or the film should be independently movable.

The projector motor has two field coils corresponding to both directions of rotation. A resistor is provided in the circuit of each coil. Each resistor is controllable by means defining and sensing the difference in length between the film advanced and the corresponding length of sound tape normally spooled during synchronous operation, for example, by differential gearing or the senser of a control loop of the sound or film tape.

In a preferred embodiment of the invention both resistors are arranged to cooperate preferably with a single common sliding wiper. Preferably the arrangement may be such that in the central or neutral position of the means defining and sensing the difference in length between the film advanced and the corresponding length of sound tape normally spooled during synchronous operation both coils are deenergized.

Some illustrative embodiments of the invention are shown by way of example in the accompanying drawing, wherein:

FIG. 1 is a diagram illustrating the synchronizing apparatus using loop control according to the invention;

FIG. 2 is a schematic of another embodiment of another synchronizing apparatus according to the invention and is illustrative of the use of differential gearing in the apparatus;

FIG. 3 is a fragmentary sectional view taken along line III—III;

FIGS. 4 and 5, are schematics illustrating two other embodiments of synchronizing apparatus.

According to the drawings a series motor 1 of a projector 49, shown in reduced dimensions, has two inversely magnetizing field coils 2 and 3 which are connected to resistors 4 and 5. When the field coil 3 is energized the rotor rotates in a counterclockwise direction and when the field coil 2 is energized the rotor rotates in a clockwise direction. A movable contact or sliding wiper 6 cooperates through a sliding contact 7 in common with the resistors 4 and 5. The sliding wiper is connected to the main supply, not shown. The sliding wiper 6 is arranged on a pivotally movable lever or arm 9 pivotally mounted on a pivot 8. The lever 9 carries a roller 10 around which the sound tape 11 runs. The tape runs between the rolls 12 out of the sound tape playback apparatus 23, shown in reduced dimensions, over a guide roller 13, the roller 10 and other guide rollers 14, 15 to a drive roller 16 coupled to the film drive.

The sound tape is pressed on the drive roller 16 by a pressure roll 17, which is pivotally mounted, so that a slipless connection by friction is achieved. The roller 17 is mounted on a two-arm lever 18, with its free end portion coacting with two pins 45, 46 arranged on a slidable plate 19 for actuating the plate by the lever 18. The plate is moved into the position shown in broken lines, when the pressure roll 17 is lifted. The pin 20 of the lever 9 moves into a guide 21 of the slidable plate as it moves in a leftward direction and the lever 9 is thereby brought and held in a central or neutral position, shown in full lines. When the pressure roll 17 is in operating position after the tape 11 has been threaded in the apparatus the plate 19 is in the position shown in solid lines. In case the roller 10 assumes the position 10a, the tension of a spring 22 has to be overcome for replacing the lever 9 in its central position. When the roller 10 is moved from the position 10b to its central or median position the sound tape 11 must be drawn over the roller 16. A relatively small force is necessary for this movement, since the pressure roll 17 is lifted during the replacing movement.

The arrangement described acts as follows.

In case the sound tape apparatus 23 is put in action when the projector is switched off (lever 9 is in the position shown in full lines), the sound tape is fed in the direction of the arrow 24. A loop 25 formed by the sound tape increases. The tension of the spring 22 moves the lever 9 down, the sliding wiper 6 reaches the resistor 5 and switches on the projector motor and the field coil 3 is energized. The motor rotates in a counterclockwise direction and drives the roller 16 by intermediary of gearing, not shown. Thereby the loop 25 of the sound tape decreases and a balanced position is attained.

When the sound tape apparatus is switched on with the sound tape running in the direction of the arrow 26 the loop 25 is at first reduced and by interposition of the resistor 4 the motor 1 is switched on in an opposed rotating direction. When the arrangement is in running position and the sound tape apparatus is abruptly stopped, the loop 25 increases and the sliding wiper 6 also switches the motor 1 off. Since the motor rotates because of the inertia of its mass the sliding wiper 6 reaches the resistor 5, whereby the motor is quickly arrested under the influence of a counter torque, then the projector motor is switched off by the sliding wiper 6.

When threading the sound tape the pressure roll 17 is lifted off the drive roller 16 against the tension of a spring, not shown, and the lever is then returned by the spring to the position illustrated. Errors of position of the synchronizing device caused by incorrect adjustment of the lever 9 are eliminated since the plate 19 centers the lever 9 as the roller 17 is raised for threading the apparatus.

According to another embodiment, shown in FIGS. 2 and 3, the sliding wiper 6 is actuated by differential gearing having a gear 30 which is connected to a feed sprocket 31. A gear 32 is driven by the sound tape 11 through a roller 33. Planet pinions 34, 35 rigidly coupled to one another, are mounted on a pivotable carrier 36 on which the sliding wiper 6 is also fixed. A pressure roll 37 is mounted on a lever 38 connected to a lever 39, which has a U-shaped end portion.

The U-shaped end is caused to embrace the shaft connecting the gear 32 and the roller 33 when the roller 37 is moved apart from the roller 33, as illustrated in the position shown in full lines, when the tape 11 is being threaded in the synchronizing apparatus. As the U-shaped end of the lever 39 is swung into the position illustrated in solid lines in FIG. 2 it bears on one of two pins 40, 41 thereby rotating the carrier 36 to place the wiper 6 in a centered position between the two resistances 4, 5. When the carrier 36 is properly centered the end faces of the U-shaped end of the lever 39 abutt on the two pins 40, 41 and the carrier can no longer rotate so that there is no possibility of not accurately centering the wiper 6. When the apparatus has been threaded the pressure roller 37 is moved to the position shown in broken lines applying pressure to the tape 11 between it and the roller 33. The arm 39 connected to the arm 38 mounting the pressure roller thereby moves to a disengaged position illustrated in broken lines and the carrier is freed to pivot and move the wiper 6.

According to the embodiment shown in case of differences in the synchronous running of film and sound tape the planet pinions 34, 35 perform a compensating movement and displace the sliding wiper 6 through the carrier 36. The automatic control essentially proceeds as described according to the embodiment in FIG. 1. A tension spring 42 on the pressure roller 37 is arranged in such a manner that the pressure roller 37 is snapped from one operating position to the other, whereby intermediate positions are avoided.

FIGS. 4 and 5 show circuit diagrams of two other embodiments of the apparatus of the invention. In both constructions the motor 50 has only a single field coil 51 which is energizable in two directions. In FIG. 4 one terminal of the field coil 51 is connected to a sliding wiper 52 of a resistor 53. The sliding wiper 52 is controlled by the means or mechanism 54 defining the difference in length between film advanced and the corresponding length of sound tape normally spooled actuating reversing switches 55, 56 and 57. In this arrangement a single resistor 53 is provided, which is reverse energized by the reversing switches 56, 57 simultaneously with the reversing energization of the field coil 51.

In the arrangement according to FIG. 5 also only a single field coil 51 is provided for the motor 50, which is reversible in its direction of rotation by a switch 62, 63. Contrary to the embodiment in FIG. 4 two resistors 60, 61 are provided acting in correspondence to the respective direction of rotation of the motor. The sliding wiper 64 is common to both resistors 60, 61 and is controlled, as well as the reversing switches 62, 63, by means or mechanism 65 defining the difference of length between film advanced and the corresponding length of sound tape normally spooled.

The invention is not restricted to the shown embodiments. Numerous variations are possible without departing from the scope of the appended claims.

What I claim is:

1. In combination with a film projector having a reversible, variable speed, film drive motor for advancing film longitudinally in opposite directions, and a sound playback apparatus having a recording tape advanceable longitudinally in opposite directions, a synchronizing apparatus for synchronizing the film projector and the playback apparatus comprising, means having means for sensing at least travel of said tape for automatically sensing in both directions of film and tape travel any differences between the length of film advanced and the corresponding length of tape normally spooled when the projector and playback apparatus are in synchronous operation, means responsive to the last-mentioned means operably connected to said film drive motor comprising a compensating gear system for automatically variably operating the film drive motor to cause film advancement in synchronism with the tape and including means for automatically controllably applying a counter-torque to the motor when operating in either of said directions and the film and tape travel are out of synchronism and for reversing the motor when the difference between said length of film advanced and said length of tape normally spooled exceeds a predetermined limit thereby to maintain the projector and playback apparatus in synchronism.

2. In combination with a film projector having a reversible, variable speed, film drive motor for advancing film longitudinally in opposite directions, and a sound playback apparatus having a recording tape advanceable longitudinally in opposite directions, a synchronizing apparatus for synchronizing the film projector and the playback apparatus comprising, means having means for sensing at least travel of said tape for automatically sensing in both directions of film and tape travel any differences between the length of film advanced and the corresponding length of tape normally spooled when the projector and playback apparatus are in synchronous operation, means responsive to the last-mentioned means operably connected to said film drive motor comprising a compensating gear system, means connected to the gear system driven by the film, means connected to the gear system driven with the tape, a variable circuit operably connected to said drive motor, means operable by the compensating gear system for varying electrical values in said circuit for automatically variably operating the film drive motor to cause film advancement in synchronism with the tape, and including means for automatically controllably applying a counter-torque to the motor when operating in either of said directions and the film and tape travel are out of synchronism and for reversing the motor when the difference between said length of film advanced and said length of tape normally spooled exceeds a predetermined limit thereby to maintain the projector and playback apparatus in synchronism.

3. In combination with a film projector having a reversible, variable speed, film drive motor for advancing film longitudinally in opposite directions, and a sound playback apparatus having a recording tape advanceable longitudinally in opposite directions, a synchronizing apparatus for synchronizing the film projector and the playback apparatus comprising, means having means for sensing at least travel of said tape for automatically sensing in both directions of film and tape travel any differences between the length of film advanced and the corresponding length of tape normally spooled when the projector and playback apparatus are in synchronous operation, means responsive to the last-mentioned means operably connected to said film drive motor comprising a compensating gear system, means connected to the gear system driven by the film, means connected to the gear system driven with the tape, a variable circuit operably coupled to said drive motor, means operable by the compensating gear system for varying electrical values in said circuit for automatically variably operating the film drive motor to cause film advancement in synchronism with the tape and including means for automatically controllably applying a counter-torque to the motor when operating in either of said directions and the film and tape travel are out of synchronism and for reversing the motor when the difference between said length of film advanced and said length of tape normally spooled exceeds a predetermined limit thereby to maintain the projector and playback apparatus in synchronism.

4. In combination with a film projector having a reversible, variable speed, film drive motor for advancing film longitudinally in opposite directions, and a sound playback apparatus having a recording tape advanceable longitudinally in opposite directions, a synchronizing apparatus for synchronizing the film projector and the playback apparatus comprising, means having means for sensing at least travel of said tape for automatically sensing in both directions of film and tape travel any differences between the length of film advanced and the corresponding length of tape normally spooled when the projector and playback apparatus are in synchronous operation, means responsive to the last-mentioned means operably connected to said film drive motor comprising a compensating gear system, a variable circuit, variable resistances in said circuit, means operable by the compensating gear system for varying resistance in said circuit for automatically variably operating the film drive motor to cause film advancement in synchronism with the tape and said resistances including resistance means connected for automatically controllably applying a counter-torque to the motor when operating in either of said directions and the film and tape travel are out of synchronism and for reversing the motor when the difference between said length of film advanced and said length of tape normally spooled exceeds a predetermined limit thereby to maintain the projector and playback apparatus in synchronism.

5. In combination with a film projector having a reversible, variable speed, film drive motor for advancing film longitudinally in opposite directions, and a sound playback apparatus having a recording tape advanceable longitudinally in opposite directions, a synchronizing apparatus for synchronizing the film projector and the playback apparatus comprising, means having means for sensing at least travel of said tape for automatically sensing in both directions of film and tape travel any differences between the length of film advanced and the corresponding length of tape normally spooled when the projector and playback apparatus are in synchronous operation, means through which the tape is threaded comprising a movable electrical contact responsive to the last-mentioned means operably connected to said film drive motor for variably operating the film drive motor to cause film advancement in synchronism with the tape and including means connected for automatically controllably applying a counter-torque to the motor under control of said movable electrical contact when operating in either of said directions and the film and tape travel are out of synchronism and for reversing the motor when the difference between said length of film advanced and said length of tape normally spooled exceeds a predetermined limit thereby to maintain the projector and playback apparatus in synchronism.

6. The combination according to claim 5, further including means operable in threading the tape through said means responsive to said sensing means for positioning said movable electrical contact in a neutral position of operation corresponding to a position in which the projector and playback apparatus are in optimum synchronization of the film and tape travel when the tape is threaded into said means responsive to said sensing means.

References Cited in the file of this patent

UNITED STATES PATENTS 1,070,647    Whittingham _____ Aug. 19, 1913

FOREIGN PATENTS

P 13792 IX/57a    Germany _____ Nov. 22, 1956